US006665423B1

(12) United States Patent
Mehrotra et al.

(10) Patent No.: US 6,665,423 B1
(45) Date of Patent: Dec. 16, 2003

(54) METHOD AND SYSTEM FOR OBJECT-ORIENTED MOTION-BASED VIDEO DESCRIPTION

(75) Inventors: Rajiv Mehrotra, Rochester, NY (US); A. Murat Tekalp, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/492,635

(22) Filed: Jan. 27, 2000

(51) Int. Cl.$^7$ ................................................ G06K 9/46
(52) U.S. Cl. ...................................... 382/107; 382/236
(58) Field of Search ............................... 382/107, 236, 382/103; 348/135, 143, 154, 155

(56) References Cited

U.S. PATENT DOCUMENTS

| | | | | |
|---|---|---|---|---|
| 5,557,684 A | * | 9/1996 | Wang et al. | 382/107 |
| 5,907,626 A | | 5/1999 | Toklu et al. | 382/107 |
| 5,920,657 A | * | 7/1999 | Bender et al. | 382/284 |
| 5,943,445 A | * | 8/1999 | Dufaux | 382/236 |
| 5,969,755 A | * | 10/1999 | Courtney | 348/143 |
| 6,128,396 A | * | 10/2000 | Hasegawa et al. | 382/103 |
| 6,252,975 B1 | * | 6/2001 | Bozdagi et al. | 382/107 |
| 6,366,701 B1 | * | 4/2002 | Chalom et al. | 382/236 |
| 2001/0048753 A1 | * | 12/2001 | Lee et al. | 382/103 |

OTHER PUBLICATIONS

Altunbasak et al, Two dimensional object–based coding using a content–based mesh and affine motion parameterization, Proceedings of International Conference on Image Processing 1995, Oct. 23–26, 1995, vol 2, p 394–397.*

Sawhney et al, Compact representations of videos through dominant and multiple motion estimation, IEEE Transactions on Pattern Analysis and Machine Intelligence, Aug. 1996, vol 18, iss 8, p 814–830.*

Eren et al, Region–based affine motion segmentation using color information, 1997 IEEE International Conference on Acoustics, Speech, and Signal Processing, Apr. 21–24, 1997, vol 4, p 3005–3008.*

Gunsel et al, Object–based video indexing for virtual–studio productions, 1997 Proceedings of IEEE Computer Society Conference on Computer Vision and Pattern Recognition, Jun. 17–19, 1997, p 769–774.*

Altunbasak et al, Simultaneous object segmentation, multiple object tracking and alpha map generation, Proceedings of International Conference on Image Processing 1997, Oct. 26–29, 1997, vol 1, p 69–72.*

Borshukov et al, Motion segmentation by multistage affine classification, IEEE Transactions on Image Processing, Nov. 1997, vol 6, iss 11, p 1591–1594.*

Tekalp et al, Two–dimensional mesh–based visual–object representation for interactive synthetic/natural digital video, Proceedings of the IEEE, Jun. 1998, vol 86, iss 6, p 1029–1051.*

(List continued on next page.)

Primary Examiner—Bhavesh M. Mehta
Assistant Examiner—Christopher Sukhaphadhana
(74) Attorney, Agent, or Firm—David M. Woods

(57) ABSTRACT

An object-oriented method for describing the content of a video sequence comprises the steps of (a) establishing a temporal object-based segment for an object of interest; (b) describing the temporal object-based segment by describing one or more semantic motions of the object within its temporal object-based segment; and (c) describing the temporal object-based segment by describing one or more semantic interactions of the object with one or more other objects within its temporal object-based segment. The semantic motions of the object may be further described in terms of the properties of elementary coherent motions within the semantic motion. Additionally, the semantic interactions of the object may be further described in terms of the properties of the elementary spatio-temporal relationships among the interacting objects.

12 Claims, 4 Drawing Sheets

OTHER PUBLICATIONS

Kurokawa et al, Representation and retrieval of video scene by using object actions and their spatio–temporal relationships, Proceedings of 1999 International Conference on Image Processing, Oct. 24–28, 1999, vol 2, p 86–90.*

"Efficient Filtering and Clustering Methods for Temporal Video Segmentation and Visual Summarization" by A. Mufit Ferman and A. Murat Tekalp. Journal of Visual Commun. and Image Rep., vol. 9, pp. 336–351, 1998.

"On Video Retrieval: Content Analysis by ImageMiner" by Peter Alshuth, Thorsten Hermes, Lutz Voigt, and Otthein Herzog, SPIE: Storage and Retrieval for Image and Video Databases, vol. 3312, pp. 236–247, 1998.

"Netra–V: Towards an Object–based Video Representation" by Yining Deng, Debargha Mukherjee and B.S. Manjunath. vol. 3312, pp. 202–213, 1998.

"A Fully Automated Content Based Video Search Engine Supporting Spatio–Temporal Queries" by Shih–Fu Chang, William Chen, Horace J. Meng, Hari Sundaram, Di Zhong. IEEE Trans. Circuits and Systems for Video Tech, vol. 8, pp. 602–615, 1998.

"Tracking Motion and Intensity Variations Using Hierarchical 2–D Mesh Modeling for Synthetic Object Transfiguration" by Candemir Toklu, A.Tanji Erdem, M. Ibrahim Sezan, and A. Murat Tekalp. Graphical Models and Imaging Processing, vol. 58, No. 6, pp. 553–573, Nov. 1996.

"Machine Vision" by Ramesh Jain, Rangachar Kasturi, and Brian G. Schunck. Prentice Hall: 1995, pp. 459–486.

"The Representation and Recognition of Action Using Temporal Templates" by James W. Davis and Aaron F. Bobick. Proceeding of the conference on Computer Vision and Pattern Recognition, pp. 928–935, Jul. 1997.

U.S. patent application Ser. No. 08/902,545, Warnick et al., filed Jul. 29, 1997.

U.S. patent application Ser. No. 09/059,817, Gunsel et al., filed Apr. 14, 1998.

* cited by examiner

METHOD AND SYSTEM FOR OBJECT-ORIENTED MOTION-BASED VIDEO DESCRIPTION

FIELD OF THE INVENTION

The invention relates generally to the field of video processing, and in particular to the characterization of object motion and the interaction between video objects in a video sequence.

BACKGROUND OF THE INVENTION

Rapid proliferation of multimedia applications presents a growing need for new effective representations of video sequences that allow not only compact storage but also content-based functionalities such as object-oriented editing, navigation, search, and browsing. The huge size and rich content of video data makes organization, indexing and management of visual databases for efficient and effective browsing and retrieval an extremely challenging task. Most of the existing technologies in video indexing and retrieval are frame-based. In frame-based indexing, a shot is the basic unit for indexing and retrieval. As the term is used herein, a shot is ordinarily a set of consecutive frames captured by a single operation of a camera, representing a continuous action in time and space. (Accordingly, a story is a collection of shots, which are semantically related.) Global image features such as frame-based color histograms are extracted from frames within a shot to characterize a shot. Alternatively, each shot is characterized by a representative frame and global characteristic of the representative frame (see commonly assigned U.S. patent application Ser. No. 08/902,545, filed Jul. 29, 1997, entitled "A method for content-based temporal segmentation of video" by James Warnick, et al).

The main shortcoming of this approach is that humans do not usually process video contents in terms of frames or shots. Therefore, a frame or shot-based video description and indexing approach is not in agreement with a human's process for interpreting video data. Humans analyze a dynamic scene or video data in terms of the objects of interest. In other words, a scene or imagery data is processed by the human visual system to identify objects of interest and then the scene is characterized in terms of these objects, their spatial and temporal properties and interactions. In order to adopt this human visual system-based approach, an object-oriented video description and indexing approach is essentially required. From a digital image-video processing viewpoint, an object is defined as a meaningful spatial/temporal region of an image or a video sequence.

One approach to object-oriented video description and indexing is to first segment a video sequence into shots and then to represent each shot by a representative or key frame. The next step is to identify objects of interest present in each representative frame, and then to describe and index the video sequence in terms of the identified objects (see P. Alshuth, T. Hermes, L. Voight and O. Herzog, "On Video Retrieval: Content Analysis by Image Miner", *SPIE: Storage and Retrieval for Image and Video Databases*, vol. 3312, pp. 236–247, 1998). However, this approach treats a video sequence as a set of still images and thus completely ignores the time-variant or dynamic characteristics of the object. Examples of dynamic characteristics include object motion, variation in an object's shape, and interactions of an object with other objects. An object-oriented video description and indexing system should be able to characterize video data in terms of the time-variant features of the objects. Unlike the description of still images which consists solely of spatial features such as color, texture, shape and spatial composition, temporal features such as object motion, variation of object shape, and interaction between multiple objects are key features for describing video content.

Some existing approaches have integrated motion into video description and indexing. Netra-V is an object/region-based video indexing system, which employs affine motion representation for each region (see Y. Deng, D. Mukherjee and B. S. Manjunath, "Netra-V: Toward an Object-based Video Representation", *SPIE: Storage and Retrieval for Image and Video Databases*, vol. 3312, pp. 202–213, 1998). Motion is the key attribute in Video Q, in which a web interface allows users to specify an arbitrary polygonal trajectory for a query object, thereby allowing objects that have similar motion trajectories to be retrieved (see S.-F. Chang, W. Chen, H. J. Meng, H. Sundaram and D. Zhong, "A Fully Automated Content-based Video Search Engine Supporting Spatiotemporal Queries", *IEEE Trans. Circuits and Systems for Video Tech.*, vol. 8, pp. 602–615, 1998 and commonly assigned U.S. patent application Ser. No. 09/059,817, filed Apr. 14, 1998 and entitled "A computer program product for generating an index and summary of a video" by Bilge Gunsel, et al). These approaches are limited in the sense that temporal characterization of an object is simply in terms of its low-level motion characteristics. Other time variant features such as changes in object shape or object interactions have been completely ignored. Also, high-level or semantic temporal characteristics of the objects are not used for description or indexing of the video sequence.

What is needed is an object-oriented description of video contents in terms of both low-level and semantic level time varying characteristics of an object. Each object should be described by its spatial and temporal features, with object temporal actions, and interaction viewed as primary attributes of objects. Objects should be segmented and tracked within shots, and features related to object motion, actions, and interaction should be extracted and employed for content-based video retrieval and video summary and/or browsing.

SUMMARY OF THE INVENTION

An object of this invention is to provide an object-oriented description of video contents in terms of both low-level and semantic level time varying characteristics of an object.

Another object is to provide a procedure to develop the object-oriented description of video content.

The present invention is directed to overcoming one or more of the problems set forth above. Briefly summarized, according to one aspect of the present invention, an object-oriented method for describing the content of a video sequence comprises the steps of (a) establishing an object-based segment for an object of interest; (b) describing the object-based segment by describing one or more semantic motions of the object within its segments; and (c) describing the object-based segment by describing one or more semantic interactions of the object with one or more other objects within its object-based segment. The semantic motions of the object may be further described in terms of the properties of elementary coherent motions within the semantic motion. Additionally, the semantic interactions of the object may be further described in terms of the properties of the elementary spatio-temporal relationships among the interacting objects.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because hierarchical representations of video sequences are well known, the present description will be directed in particular to elements forming part of, or cooperating more directly with, the present invention. Elements not specifically shown or described herein may be selected from those known in the art. In the following description, a preferred embodiment of the present invention would ordinarily be implemented as a software program. Those skilled in the art will readily recognize that the equivalent of such software may also be constructed in hardware. Given the description as set forth in the following specification, all software implementation as a computer program is conventional and within the ordinary skill in such arts.

This invention is concerned with the object-oriented description of the contents of a video sequence. An object within a video sequence is a meaningful spatio-temporal region that can be characterized by spatial and temporal attributes. In general, an object can be further viewed or described as a composition of other objects. Spatial attributes of a video sequence are frame-based and therefore are extracted from a frame. Examples of spatial attributes include a set of objects in a frame; the color, texture and shape of the objects; and the spatial composition of the objects. Temporal attributes are time-variant properties of objects. Examples of temporal attributes include rigid motion parameters and shape deformation of the objects, and semantic labels for an object's motion, actions, and interactions.

Figure 1:
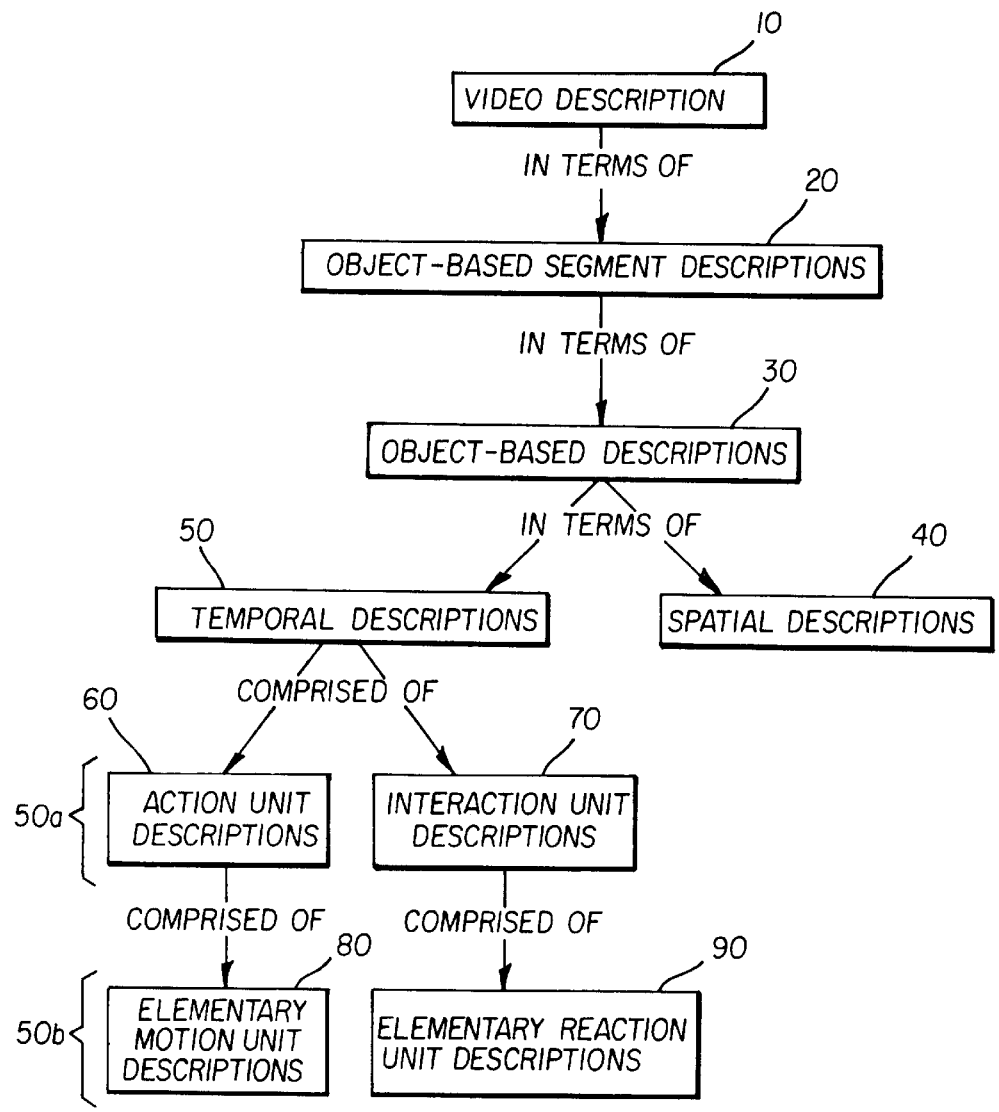
FIG. 1 is an object-oriented hierarchical description of a video sequence in accordance with the invention.

This invention employs a hierarchical object-oriented video content description scheme as depicted in FIG. 1. A video description 10 provides a description of a video sequence in terms of a composition of a set of object-based segments, each of which in turn, is characterized by an object-based segment description 20. Formally, a video sequence V is defined as $$V=\{S_i|i=1, \ldots, N\}$$

where $S_i$ denotes the i-th object-based segment and N is the number of segments. Note that a video sequence may have one or multiple segments for each object. An object-based segment S for a given occurrence of a selected or identified object (or set of related objects) is a temporal segment of video or a set of contiguous frames in which that object (or set of related objects) occurs, such as a shot or a group of consecutive shots.

Each object-based video segment S is described as a composition of a set of objects of interest, each of which in turn is characterized by an object-oriented description 30. The object-based segment description 20 also includes references to foreground and background objects, the start and end frame numbers of the segment and a visual summary of the segment. Formally, a segment S is defined as $$S=\{O_S, B_S, E_S, [V]\underline{VS}\}$$

where $O_S$ is the set of one or more objects of interest in the segment S, $B_S$ and $E_S$ denote the beginning and ending frame numbers for the segment S, and $[V]$ $\underline{VS}$ denotes the visual summary. The visual summary can be a set of one or more frames summarizing the contents of the segment.

The object-oriented description 30 of an object of interest O comprises its identifier, a spatial description 40 and a temporal description 50. Formally, an object of interest O is defined as $$O=\{\text{Object\_Id}, C_O, D_S, D_t\}$$

where Object_Id is the object identifier, $C_O$ is the set of object_ids of the component objects that compose the object O, $D_S$ denotes the spatial description and $D_t$ denotes the temporal description of the object O. Low-level as well as semantic descriptors may be employed in both spatial and temporal description of an object. The preferred spatial description 40 describes an object by its color properties, texture properties, and spatial composition. The spatial description $D_S$ will not be further described since it is not the principal emphasis of this invention.

In accordance with the invention, the preferred temporal description 50 is a two-level description of the object motion and its interactions with other objects. The first level 50a of the temporal description corresponds to a semantic description and the second level 50b corresponds to a low-level description. A "semantic" description consists of application domain or user-specific description in terms a set of labels, keywords, or identifiers. In other words, semantic descriptors and descriptions are subjective. On the other hand, a "low-level" descriptor or description is objective and independent of the application domain or user. A low-level descriptor is either computed/assigned automatically or manually. In the current implementation, the low-level description 50b of an object-based segment comprises two components: one component 80 describes an object-based segment as a composition of motion-based segments, where within each motion-based segment the object's motion is coherent without any abrupt and dramatic changes. A second component 90 of the object-based description comprises a description of the object's interactions with other objects of interest that may be present within the object-based segment.

With regard to the first component 80, such motion-based segments are hereby referred to as elementary motion units, and the first component consequently comprises elementary motion unit descriptions 80. Each elementary motion unit (E) is then described by its identifier, a semantic label, a starting and ending frame number, a parametric motion model that best represents the dominant motion within the elementary motion unit, the motion trajectory of the object's centroid, and a visual summary of the video segment corresponding to the elementary motion unit. Formally, an elementary motion unit E is defined as $$E=\{\text{EMU}_{13} \text{ Id}, \text{EMU\_labels}, B_E, E_E, DM, T, VS\}$$

where EMU_Id and EMU_labels are the identifier and a set of zero or more application domain or user-specific semantic labels, respectively, $B_E$ and $E_E$ denote the beginning and the ending frame for the elementary motion unit, DM is the dominant motion description (i.e., the parametric motion model), T is the motion trajectory of the object's centroid, and VS is the visual summary. In the present implementation, the provision of EMU_labels is optional. The preferred parametric motion model is the affine motion model.

The second component 90 of the low-level temporal description 50b is comprised of a set of further components, each describing an object's interactions with another object within the video segment S. The set of consecutive frames having the same interaction between a pair of objects is called an elementary reaction unit, and the second component consequently comprises elementary reaction unit descriptions 90. The current implementation provides two different options for identifying and describing the elementary reaction units. In the first option, three types of spatio-temporal relationships between two interacting objects (the primary object being described and another object, called the interacting object) are defined for the preferred description of the object's interactions. These spatio-temporal relationships include: (i) coexistence (two objects appear together without any other type of spatio-temporal relationship between them), (ii) spatial contact (the boundaries of the two objects overlap) and (iii) occlusion (one object occludes the other object).

In this option, each elementary reaction unit is then described by the interacting object identifiers of the respective interacting objects, start and end frame numbers of the interaction, the type of spatio-temporal relationship and a relationship-specific description. In the present implementation, for a spatial contact type of spatio-temporal relationship, the relationship-specific description is the common/shared boundary; for an occlusion type of spatio-temporal relationship, the occlusion boundary and the occlusion order is described. Formally, an elementary reaction unit is defined as $$R_1 = \{ERU\_Id, ERU\_labels, O_R, B_r, E_r, IT, D\}$$

Where ERU_Id and ERU_labels are the identifier and a set of zero or more semantic labels, respectively, $O_R$ is the interacting object's identifier, $B_r$ and $E_r$ are the beginning and ending frame numbers of the elementary reaction unit R, IT is the interaction type and D is the relationship-specific description. In the present implementation, the provision of ERU_labels is optional. The preferred parametric motion model is the affine motion model.

The second option for identifying and describing elementary reaction units identifies, for each interacting object, the overlapping segments of the primary object-based segment and the interacting object-based segment. Such an overlapping segment of the two objects is further partitioned into segments such that within a partitioned segment the relative motion of the interacting object with respect to the primary object remains unchanged or doesn't change abruptly. Such a segment of the video is considered an elementary reaction unit for the two objects. In this option, an elementary reaction unit is formally described as $$R_2 = \{ERU\_Id, ERU\_labels, O_R, B_r, E_r, T_R, D_R\}$$

Where ERU_Id, ERU_labels, $O_R$, $B_r$ and $E_r$ are as defined earlier. $T_R$ is the trajectory of the centroid of interacting object $O_R$ with respect to the centroid of the primary object being described, $D_R$ is the parametric motion representation of the dominant motion of interacting object $O_R$ with respect to the centroid of the primary object being described. In the present implementation, the provision of ERU_labels is optional. The preferred parametric motion model is the affine motion model.

The semantic-level description of the object motion is obtained by respectively merging the low-level components corresponding to a meaningful object motion (descriptions 80) or interaction (descriptions 90). Accordingly, the first level 50a of the temporal description corresponds to a semantic description comprised of two components: one component 60 describes a semantic description of meaningful object motion and a second component 70 describes a semantic description of meaningful interactions between the objects. Specifically, an ordered set of elementary motion units E corresponding to a semantic or meaningful motion forms a semantic motion unit. This semantic motion unit is hereby referred to as an action unit A, and the first component 60 consequently comprises action unit descriptions 60. Note that an ordered set of action units can define another action unit. Hence, a hierarchy of action units is possible. An action unit A is described by its unique identifier, a set of one or semantic labels for the action A, and the set of identifiers of the corresponding set of component action or component elementary motion units. Formally, an action unit A is defined as $$A = \{Action\_Id, Action\_labels, C_A\}$$

where Action_Id and Action_labels are the identifier and the set of one or more semantic labels for the action, respectively, and $C_A$ is the set of identifiers of component actions or the component elementary motion units of A. Similarly, an ordered set of consecutive elementary reaction units corresponding to a meaningful or semantic interaction with one or more objects forms a semantic-level unit for the description of an object's interaction. A semantic interaction unit is called an interaction unit I, and the second component 70 consequently comprises interaction unit descriptions 70. An object's interactions can be described hierarchically in terms of component interaction units. An interaction unit I is described by a unique identifier, a set of one or more semantic labels for I, the set of identifiers of the participating objects and the set of identifiers of the associated component interaction units or elementary reaction units. Formally, an interaction unit I is defined as $$I = \{Interaction\_Id, Interaction\_labels, O_I, C_I\}$$

where Interaction_Id and Interaction_labels are the identifier and a set of one or more semantic labels for the interaction, $O_I$ denotes the set of identifiers of the objects interacting with the primary object in the interaction unit I, and $C_I$ denotes the set of identifiers of the component interaction units or the component elementary reaction units.

Figure 2:
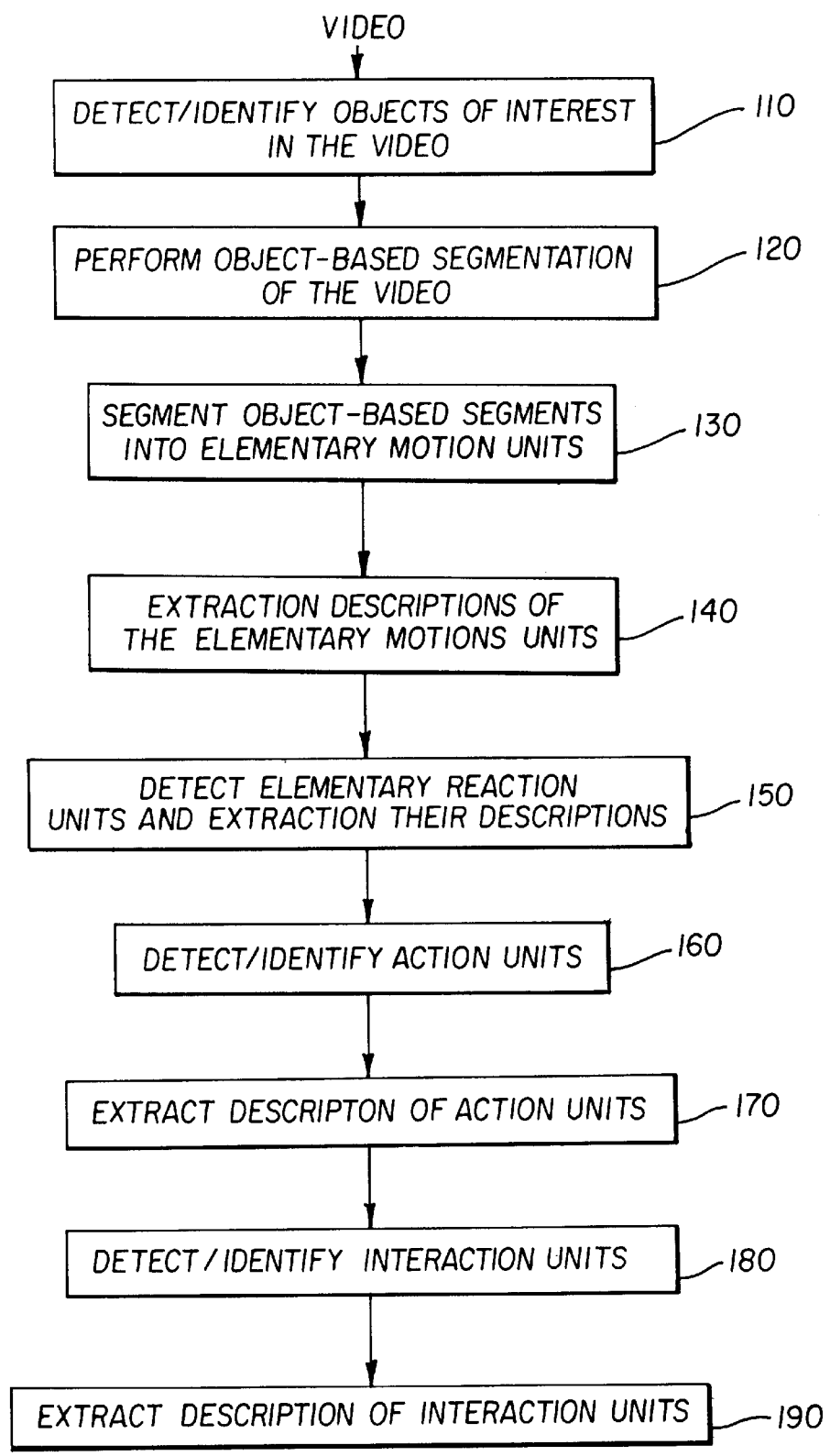
FIG. 2 is an illustration of a method for extracting a description of a video sequence in accordance with the description shown in FIG. 1.

A method to obtain and/or extract the aforementioned description of a video sequence is outlined in FIG. 2. The first step 110 is to detect or select every occurrence of the objects of interest in the video sequence. For certain applications, a precompiled set of object models can be used in a model-based or appearance-based object detection approach to automatically detect every occurrence of each of the objects (see, e.g., R. Jain, R. Kasturi and B. G. Schunck, *Machine Vision*, Prentice Hall: 1995, pp. 459–486). Alternatively, if the video sequence is chroma-keyed and/or encoded using an object-oriented scheme such as MPEG-4, then this information is contained in an alpha plane of each object. User interactions can also be used for the selection of the objects of interest, where, e.g., the object of interest is manually identified in the first frame and then automatically tracked until the object ceases to exist. (see C. Toklu, A. T. Erdem, M. I. Sezan and A. M. Tekalp, "Tracking motion and intensity-variations using hierarchical 2-D mesh modeling for synthetic object transfiguration," *Graphical Models and Imaging Processing*, vol. 58, no. 6, pp. 553–573, Nov. 1996; Y. Fu, A. T. Erdem and A. M. Tekalp, "Occlusion Adaptive Motion Snake," *Proc. ICIP '98*, 1998). In the preferred embodiment, the occurrence of an object is determined by detecting shots and searching each shot to identify a new occurrence of the object. Shot boundary detection is performed using the method proposed by A. M. Ferman and A. M. Tekalp, "Efficient Filtering and Clustering Methods for Temporal Video Segmentation and Visual Summarization," *J. Visual Commun. and Image Rep.*, Vol. 9, pp. 336–351, 1998. The objects of interest are manually identified in the first frame of each shot. After identification or selection of the object of interest, the video segments corresponding to each object are detected (in a step 120) by the method of occlusion-adaptive motion snake described by Fu, Erdem and Tekalp (op.cit.). Methods similar to those described in commonly assigned U.S. patent application Ser. No. 09/059, 817, filed on Apr. 14, 1998, entitled "A computer program product for generating an index and summary of a video" by Bilge Gunsel, et al. and U.S. Pat. No. 5,907,626, issued May 27, 1999, entitled "Method for object tracking and mosaicing an image sequence using a two dimensional mesh" by Candemir Toklu et al. (both of which are herein incorporated by reference), can also be employed to accomplish the identification and tracking of an object to detect its object-based segment.

Then the temporal object-based segment of an object is segmented into elementary motion units E in a step 130. Each elementary motion unit is a set of consecutive frames within which the dominant motion of the object remains more or less the same, i.e., a single parametric motion model can approximate the motion. Within each elementary motion unit, only one vector of parameters, called the representative parametric motion model, representing the dominant motion of the elementary motion unit, is kept. Then, the motion of an object within any video segment where that object is present can be approximated by a sequence of parametric motions, one for each elementary motion unit, and the trajectory of the object centroid within the segment. That is, the elementary motion unit is the atomic temporal unit in this motion description. The object motion and the required precision of the description determine the number of elementary motion units that compose an object's object-based segment.

Figure 3:
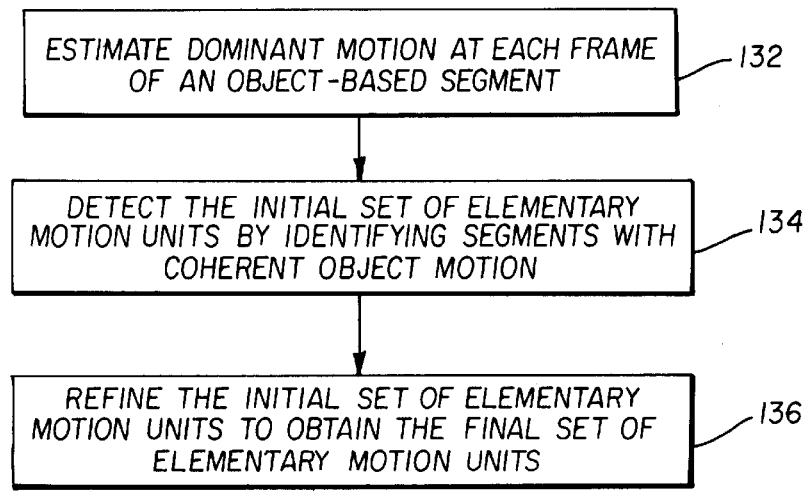
FIG. 3 is an illustration of a method for detecting and extracting elementary motion units as described in FIG. 1.

As mentioned above, the two-dimensional motion field between each adjacent pair of frames within the object's temporal object-based segment is described by fitting a parametric motion model. There are a number of motion models, e.g., 2D translation, translation-rotation-zooming, 2D affine model, etc. In this embodiment, a six-parameter affine motion model is employed to describe an object's dominant motion. An affine motion model provides a good approximation to the perspective imaging model when the field of view is small and the variation in depth of the scene along the line of z-axis is small compared to its average distance from the camera. It is capable of describing 2-D translation, rotation, magnification and shear. The preferred method for separating an object-based segment into its elementary motion units is depicted in FIG. 3. According to this method, an affine parameter set is first estimated in step 132 from a dense motion field in order to represent the dominant motion of the object between every adjacent pair of frames within the object's temporal object-based segment. In the present implementation, motion of an object is described by a 6-parameter affine model $\Omega$ defined as $$\Omega = \begin{bmatrix} h_1 & h_2 & h_3 \\ h_4 & h_5 & h_6 \\ 0 & 0 & 1 \end{bmatrix}$$

where $h_i$, i=1, ..., 6 are the model parameters. A point $(x,y)^t$ in a frame is mapped to the corresponding point $(x',y')^t$ in next frame by the transformation $\Omega$ as follows:

$$\begin{bmatrix} x' \\ y' \\ 1 \end{bmatrix} = \Omega \begin{bmatrix} x \\ y \\ 1 \end{bmatrix}$$

The motion vector $\Psi$ providing the dense motion field at location $(x,y)^t$ is defined as $$\Psi(x, y) = \begin{bmatrix} x' - x \\ y' - y \end{bmatrix}$$

The dense motion field in each frame provides the point correspondences between the adjacent pair of frames. A least square-based algorithm is used to extract the motion model from the dense motion field, such that:

$$\begin{bmatrix} h_1 \\ h_2 \\ h_3 \end{bmatrix} = \left( \begin{bmatrix} \Sigma x \\ \Sigma y \\ 1 \end{bmatrix} [\Sigma x \ \Sigma y \ 1] \right)^{-1} \begin{bmatrix} \Sigma x x' \\ \Sigma y x' \\ \Sigma x' \end{bmatrix}$$

and $$\begin{bmatrix} h_4 \\ h_5 \\ h_6 \end{bmatrix} = \left( \begin{bmatrix} \Sigma x \\ \Sigma y \\ 1 \end{bmatrix} [\Sigma x \ \Sigma y \ 1] \right)^{-1} \begin{bmatrix} \Sigma x y' \\ \Sigma y x' \\ \Sigma y' \end{bmatrix}$$

where all summations are performed over the object region. The outlier dense motion vectors may be eliminated to improve the accuracy of the representation. Those skilled in the art will recognize that the object motion can be estimated in the world coordinate system by estimating background motion and estimating object motion by compensating for the background motion.

Figure 4:
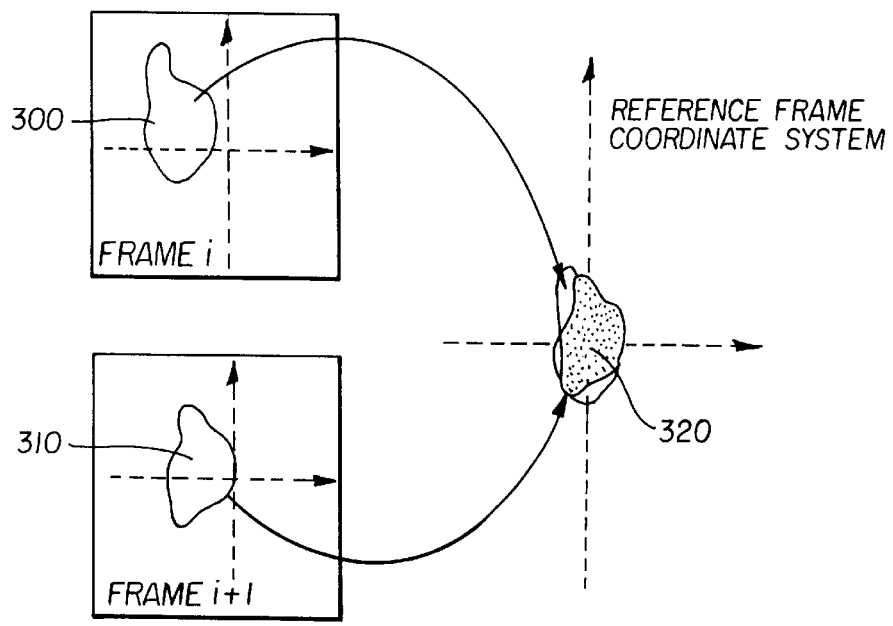
FIG. 4 is a diagram of the alignment of object centroids for computation of the motion dissimilarity measure, which is useful in the extraction of elementary motion units.

Next an initial set of elementary motion units is obtained in step 134 by identifying frames corresponding to a significant change in the object's dominant motion. This is accomplished by computing dissimilarity between the estimated motions of the adjacent frames and identifying the local maxima in the frame-by-frame dissimilarity function. As shown diagrammatically in FIG. 4, the dissimilarity of motion is computed by first changing the spatial reference of the parametric models of the two frames i and i+1 to the centroids 300 and 310 of the object regions in those frames, resulting in the new affine parameter sets $\Omega'_1$ and $\Omega'_2$. Then the centroids 300 and 310 of the object regions in the two frames are aligned in the center 320 of the reference frame and the following dissimilarity measure is obtained:

$$\beta(\Omega'_1, \Omega'_2) = \frac{\Sigma_{(x,y)}\Phi(x, y)\|\Theta_1(x, y) - \Theta_2(x, y)\|_2}{\Sigma_{(x,y)}\Phi(x, y)}$$

where, in the present implementation, $\Phi(x,y)$ is defined as:

$$\Phi(x, y) = \begin{cases} 2, & \text{if two object regions overlap at } (x, y) \\ 1, & \text{if } (x, y) \text{ is in the object region in only one frame} \\ 0, & \text{if } (x, y) \text{ is not in the object regions of any frames} \end{cases}$$

and the motion vector $\Theta_i(x,y)$ obtained by the affine model $\Omega_i$ at location $(x,y)^t$ is defined as:

$$\Theta_i(x, y) = \Omega_i \begin{bmatrix} x \\ y \\ 1 \end{bmatrix} - \begin{bmatrix} x \\ y \\ 1 \end{bmatrix}, i = 1, 2.$$

A median of all local maxima of the dissimilarity measure is selected as a threshold Q. A frame having dissimilarity greater than the computed threshold Q is detected as a frame with a significant change in motion. The set of detected significant motion change frames represents, in step 134, the initial set of elementary motion units. Then this initial set of elementary motion units is refined in step 136 by merging adjacent elementary motion units that are determined to belong together. Two adjacent elementary units are merged if the dissimilarity between the estimated motion at predefined intermediate frames, e.g., middle frames, within those two elementary motion units is less than or equal to the threshold Q. This yields the final set of segments corresponding to elementary motion units of the object-based segment. The present implementation allows the user to review and to interactively modify and/or correct elementary motion unit boundaries, if needed.

Referring back to FIG. 2, the description of each detected elementary motion unit is extracted in step 140. Another component of a low-level temporal description of an object is the description of its spatio-temporal relationships with other objects. In the current implementation, two objects are considered to have a spatio-temporal relationship when they coexist in the same frame or segment of the video sequence. In other words, if there is an overlap in the object-based segments of the two objects, they are considered to have a spatio-temporal relationship. The overlapping portion of their segments is analyzed in step 150 to identify and describe the elementary reaction units. For the first option for identification and description of an elementary reaction unit, automatic extraction of the elementary reaction units is simple given the alpha plane (segmentation maps) for each object. For any pair of a primary object and an interacting object, the algorithm to identify and describe elementary reaction units is as follows: 1) Check the object-based segments of the two objects for the overlap. If there is an overlap between the two object-based segments, then their interaction is one of "coexistence." 2) Check the spatial boundaries of two coexisting objects. If there is a common boundary between them, their interaction is redefined as one of "physical contact." (note that the interaction type "physical contact" is a special case of "coexistence.") 3) Check the change in the sizes of a pair of contacting objects. If the ratio of the size of object 1 to object 2 changes in time, then their relationship is defined as one of "occlusion." Furthermore, if the ratio increases in time, then object 1 occludes object 2; if it decreases in time, then object 2 occludes object 1. Note that the interaction type "occlusion" is a special case of "physical contact." For the second option for identification and description of elementary reaction unit, the process of identifying and describing the elementary reaction units is as follows: 1) Check the object-based segments corresponding to the two objects for the overlap. If there is an overlap between the two object-based segments, identify overlaps of their elementary motion units. Overlapping elementary motion units correspond to the segment where the motion characteristics of both objects either remain unchanged or coherent without abrupt and dramatic change. Such segments are considered elementary reaction units. 2) For each elementary reaction unit, the affine motion parameters for the motion of the interacting object with reference to the centroid of the primary object are computed. Also, the motion trajectory of the centroid of the interacting object with reference to the centroid of the primary object is computed.

For the higher level 50*a* of semantic description, the automatically computed elementary motion units are grouped into semantically meaningful units, which are the action units A set forth by the action unit descriptions 60 in FIG. 1. While the elementary motion units focus on low level motion coherence, the action units focus on semantic or meaningful action, which is something that humans can interpret and describe within an application domain. Accordingly, the detected elementary motion units are used in step 160 to identify action units. An action unit is generally a time-ordered sequence of adjacent elementary motion units that represent a semantic motion, and carry a semantic meaning. For example, an action unit of throwing a ball may comprise a sequence of elementary motion units which correspond to different states of the arm and body during the throwing motion; moreover, a complex motion such as "catching the ball" may comprise several elementary motion units. Such groupings of elementary motion units can be done interactively or through the use of domain dependent inference rules for specific content domains such as sports, surveillance, etc. For some applications, a model-based approach can be used to identify these action units (see J. David and A. Bobick, "The representation and recognition of actions using temporal templates", Proceeding of the conference on Computer Vision and Pattern Recognition, pp. 928–935, July 1997 ). In the current implementation, a user can combine elementary motion units into an action unit and annotate the action unit interactively by browsing through visual representatives of the elementary motion units belonging to an object. Then the description of each action unit is obtained in step 170.

Furthermore, and also for the higher level 50*a* of semantic description, the automatically computed elementary reaction units are grouped into semantically meaningful units, which are the interaction units I set forth by the interaction unit descriptions 70 in FIG. 1. Similar to an action unit, an interaction unit is an ordered set of consecutive elementary reaction units corresponding to a semantically meaningful interaction among objects. Accordingly, the detected elementary reaction units are analyzed in step 180 to identify the interaction units. An application-specific model-based approach can be utilized to identify the application-specific interaction units (see J. David and A. Bobick, op cit.). In the current implementation, the combination of elementary reaction units that form an interaction unit, as well as the semantic label and the annotation, are determined through user interactions that identify elementary reaction units belonging to an interaction unit. Finally, a description of each interaction unit is obtained and/or extracted in step 190, and a complete object-oriented motion description of the video sequence is obtained.

Figure 5:
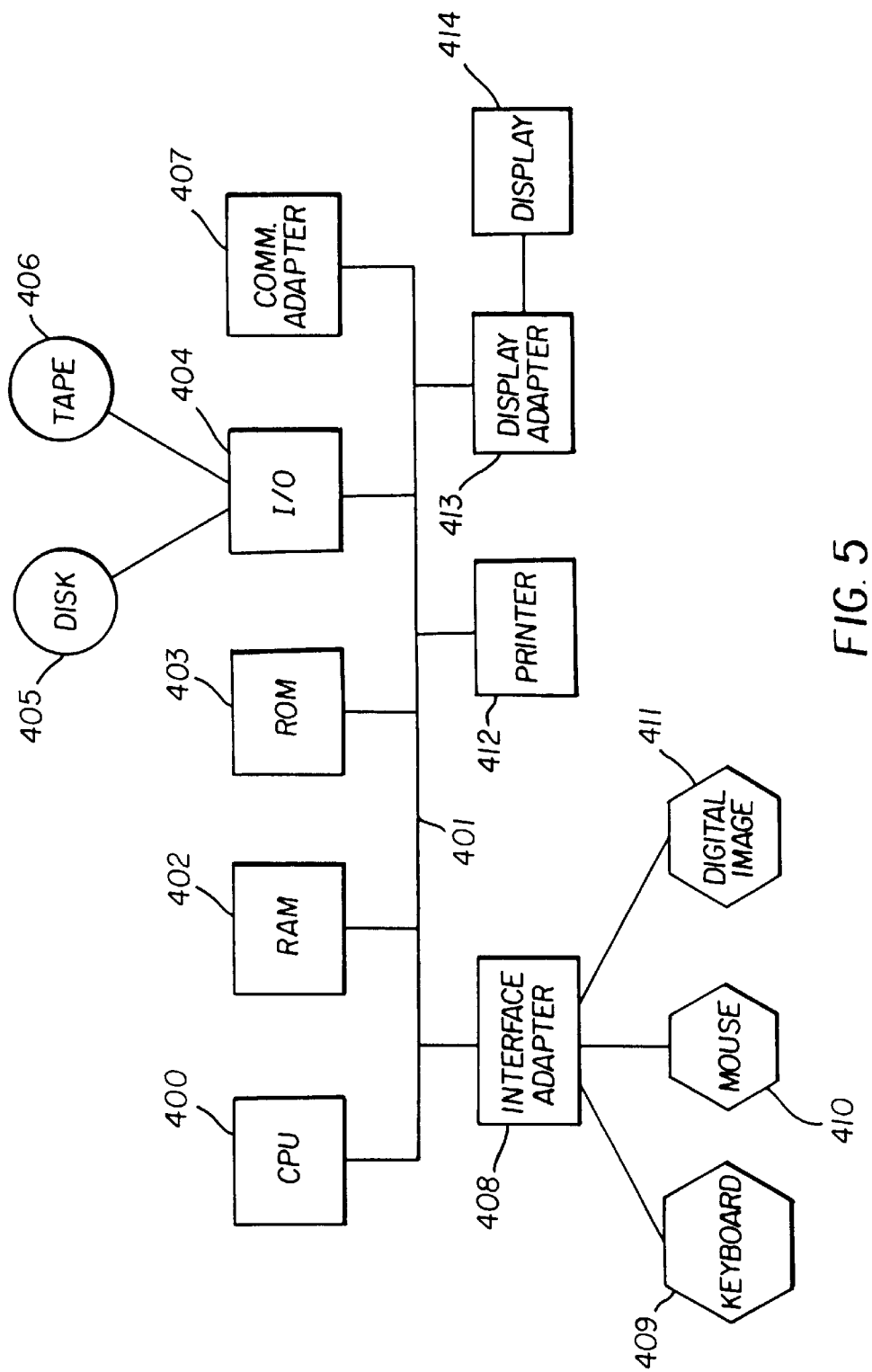
FIG. 5 is a diagram of a computer system for implementing the present invention.

While the overall methodology of the invention is described above, the invention can be embodied in any number of different types of systems and executed in any number of different ways, as would be known by one ordinarily skilled in the art. For example, as illustrated in FIG. 5, a typical hardware configuration of an information handling/computer system in accordance with the invention preferably has at least one processor or central processing unit (CPU) 400. The CPU 400 is interconnected via a system bus 401 to a random access memory (RAM) 402, a read-only memory (ROM) 403, an input/output (I/O) adapter 404 (for connecting peripheral devices such as disk units 405 and tape drives 406 to the bus 401), a communication adapter 407 (for connecting an information handling system to a data processing network), a user interface adapter 408 (for connecting peripherals 409, 410, 411 such as a keyboard, mouse, digital image input unit, microphone speaker and/or other user interface device to the bus 401), a printer 412 and a display adapter 413 (for connecting the bus 401 to a display device 414). The invention could be implemented using the structure shown in FIG. 5 by including the inventive method within a computer program stored on the storage device 405. Such a computer program would act on video sequences embodied in a time series of image frames supplied through the interface units 409, 410, 411 or through the network connection 407. The system would then automatically produce the object-oriented description of the video sequences as output on the disk units 408 or tape drives 406 or back to the network 407.

The invention has been described with reference to a preferred embodiment. However, it will be appreciated that variations and modifications can be effected by a person of ordinary skill in the art without departing from the scope of the invention.

PARTS LIST 10 video description
20 object-based segment description
30 object-based descriptions
40 spatial descriptions
50 temporal descriptions
50a first level
50b second level
60 action unit descriptions
70 interaction unit descriptions
80 elementary motion unit descriptions
90 elementary reaction unit descriptions
110–190 steps
300 centroid
310 centroid
320 center of the reference frame
400 CPU
401 bus
402 RAM
403 ROM
404 I/O adapter
405 disk unit
406 tape drive
407 communication adapter
408 user interface adapter
409 keyboard
410 mouse
411 digital image input unit
412 printer
413 display adapter
414 display device

What is claimed is:

1. An object-oriented method for describing the motion content of a video sequence, said method comprising the steps of:
  (a) identifying a primary object of interest and an interacting object of interest, and detecting one or more object-based segments corresponding to both objects;
  (b) describing the object-based segment by one or more interaction units that provide a semantic description of meaningful interactions between the objects; and
  (c) describing each interaction unit as a composition of interaction-based segments, wherein each interaction-based segment comprises an elementary reaction unit that describes the primary object's interaction with the interacting object, wherein the description of the primary object's interaction with the interacting object includes a parametric motion representation of the relative motion of the interacting objects including the dominant motion of the interacting object with respect to the centroid of the primary object.

2. The method as claimed in claim 1 wherein each description provided by step (c) includes a beginning and ending identifier for each elementary reaction unit.

3. The method as claimed in claim 1 wherein each description provided by step (c) includes identification of the type of interaction.

4. The method as claimed in claim 3 wherein the type of interaction is selected from the group including spatial coexistence, spatial contact and spatial occlusion.

5. The method as claimed in claim 1 wherein each description provided by step (c) includes description of the temporal overlapping of the interacting objects.

6. A method for automatically detecting elementary motion units in order to describe the content of a video sequence, said method comprising the steps of:
  (a) identifying an object of interest and detecting an object-based segment corresponding to the object;
  (b) estimating the dominant motion of the object in frames of the video sequence;
  (c) computing a dissimilarity value representing dominant motion of the object between frames of the video sequence; and
  (d) establishing elementary motion units corresponding to significant changes in the dissimilarity value.

7. The method as claimed in claim 6 wherein the step (b) of estimating the dominant motion of the object includes estimation of the affine motion parameters of the dominant motion.

8. The method as claimed in claim 7 wherein the step (c) of computing a dissimilarity value representing dominant motion of the object between frames includes computing the dissimilarity of dominant motion by comparing the affine models of the object in adjacent frames.

9. A method for automatically detecting elementary motion units in order to describe the content of a video sequence, said method comprising the steps of:
  (a) identifying an object of interest and detecting an object-based segment corresponding to the object;
  (b) providing a dense motion field in each frame representing motion of the object between frames within the object-based segment;
  (c) estimating an affine parameter set from the dense motion field in order to represent the estimated dominant motions of the object;
  (d) computing a dissimilarity value representing dominant motions of the object between adjacent frames;

(e) identifying local maxima in the dissimilarity value; and establishing elementary motion units corresponding to significant changes in the local maxima.

10. A method for automatically detecting elementary reaction units in order to describe the content of a video sequence, said method comprising the steps of:

(a) identifying a primary object of interest and an interacting object of interest, and detecting object-based segments corresponding to both objects;

(b) establishing the spatio-temporal relationship between the primary object and the interacting object from any one or more of the group including (i) coexistence wherein the two objects appear together without any other type of spatio-temporal relationship between them, (ii) spatial contact wherein the boundaries of the two objects overlap and (iii) occlusion wherein one object occludes the other object; and (c) establishing elementary reaction units descriptive of the spatio-temporal relationship established in step (b).

11. The method as claimed in claim 10 wherein establishing the spatio-temporal relationship in step (b) comprises:

(a) determining if there is overlap between both object-based segments in order to establish coexisting objects;

(b) determining if there is a common boundary between the two coexisting objects in order to establish spatially contacting objects; and (c) determining if there is frame-to-frame change in the relative sizes of a pair of contacting objects in order to establish occluding objects.

12. A method for automatically detecting elementary reaction units in order to describe the content of a video sequence, said method comprising the steps of:

(a) identifying a primary object of interest and an interacting object of interest, and detecting object-based segments corresponding to both objects;

(b) identifying overlapping regions of the primary and interacting objects and partitioning the regions into elementary reaction units where the relative motion either remains unchanged between frames or coherent without abrupt and dramatic changes;

(c) computing a parametric motion model for the motion of the interacting object with reference to the primary object;

(d) computing the motion trajectory of the interacting object with reference to the primary object; and (e) providing description of the elementary reaction units in terms of the parametric motion model and the motion trajectory established in steps (c) and (d).

* * * * *